(12) United States Patent
Kool et al.

(10) Patent No.: US 11,155,721 B2
(45) Date of Patent: Oct. 26, 2021

(54) ARTICLES FOR HIGH TEMPERATURE SERVICE AND RELATED METHOD

(71) Applicant: General Electric Company, Schenectady, NY (US)

(72) Inventors: Lawrence Bernard Kool, Clifton Park, NY (US); Bernard Patrick Bewlay, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 277 days.

(21) Appl. No.: 15/891,241

(22) Filed: Feb. 7, 2018

(65) Prior Publication Data

US 2019/0010338 A1    Jan. 10, 2019

Related U.S. Application Data

(60) Provisional application No. 62/529,165, filed on Jul. 6, 2017.

(51) Int. Cl.
| | |
|---|---|
| *C09D 5/32* | (2006.01) |
| *C09D 7/61* | (2018.01) |
| *C09D 1/00* | (2006.01) |
| *C23C 24/08* | (2006.01) |
| *C23C 24/00* | (2006.01) |
| *F16J 1/01* | (2006.01) |
| *C08K 3/08* | (2006.01) |

(52) U.S. Cl.
CPC .............. *C09D 5/32* (2013.01); *C09D 1/00* (2013.01); *C09D 7/61* (2018.01); *C23C 24/00* (2013.01); *C23C 24/08* (2013.01); *C23C 24/085* (2013.01); *C08K 2003/0812* (2013.01); *F16J 1/01* (2013.01)

(58) Field of Classification Search
None
See application file for complete search history.

(56) References Cited

U.S. PATENT DOCUMENTS

| | | | |
|---|---|---|---|
| 4,564,555 A | 1/1986 | Hornberger | |
| 4,615,913 A * | 10/1986 | Jones | C23C 18/1216 427/226 |
| 4,977,036 A * | 12/1990 | Baldi | C23C 10/06 428/553 |
| 5,477,820 A | 12/1995 | Rao | |
| 6,413,582 B1 | 7/2002 | Park et al. | |
| 6,485,780 B1 | 11/2002 | Sangeeta et al. | |
| 6,919,121 B2 * | 7/2005 | Stowell | C23C 24/08 428/161 |
| 7,311,940 B2 | 12/2007 | Nagaraj et al. | |
| 7,449,241 B2 | 11/2008 | Gigliotti, Jr. et al. | |
| 8,029,702 B2 | 10/2011 | Cordaro et al. | |
| 9,096,763 B2 | 8/2015 | Belov et al. | |
| 2004/0109948 A1 * | 6/2004 | Graham | C23C 10/02 427/383.1 |
| 2011/0159175 A1 | 6/2011 | Groh et al. | |
| 2012/0016170 A1 * | 1/2012 | Ould-Chikh | B01J 13/04 585/273 |
| 2013/0156958 A1 * | 6/2013 | Belov | C23C 24/08 427/372.2 |
| 2015/0017044 A1 | 1/2015 | Steinwandel et al. | |

FOREIGN PATENT DOCUMENTS

| | | |
|---|---|---|
| EP | 1700930 A1 | 9/2006 |
| EP | 1788122 A1 | 5/2007 |
| JP | 58192949 A | 11/1983 |
| JP | 2014020282 A | 2/2014 |
| JP | 2015209804 A | 11/2015 |
| JP | 2015224362 A | 12/2015 |
| JP | 2016006211 A | 1/2016 |

OTHER PUBLICATIONS

International Search Report and Written Opinion issued in connection with corresponding PCT Application No. PCT/US2018/036899 dated Oct. 2, 2018.
P.M. Pierz., "Thermal barrier coating development for , diesel engine aluminum pistons", Surface and Coatings Technology, vol. 61, Issues: 1-3, Dec. 1993, pp. 60-66.
European Supplementary Search Report and Written Opinion for European Application No. 18828354.3, dated Apr. 12, 2021, 6 pages.

* cited by examiner

*Primary Examiner* — Sheeba Ahmed
(74) *Attorney, Agent, or Firm* — Armstrong Teasdale LLP

(57) ABSTRACT

An article for high temperature service is presented. The article includes a substrate and a thermal barrier coating disposed on the substrate. The thermal barrier coating includes a plurality of aluminum-based particles dispersed in an inorganic binder, wherein the aluminum-based particles are substantially spaced apart from each other via the inorganic binder such that the thermal barrier coating is substantially electrically and thermally insulating. Method of making the article is also presented.

21 Claims, 5 Drawing Sheets

ARTICLES FOR HIGH TEMPERATURE SERVICE AND RELATED METHOD

BACKGROUND

The disclosure relates generally to coatings used in articles for high temperature service. More particularly, the disclosure relates to articles including thermal barrier coatings.

Thermal barrier coatings are typically used in articles that operate at or are exposed to high temperatures, e.g., gas turbine engines. Use of thermal barrier coatings in the automotive industry has also been found to yield a significant effect on the efficiency of engines. Thermal barrier coatings typically allow for higher operating temperatures, thereby enabling higher fuel efficiencies.

The selection of thermal barrier coating materials is restricted by requirements, such as, high melting point, no/minimal phase transformation between room temperature and operation temperature, low thermal conductivity, chemical inertness, thermal expansion match with the underlying substrate, and good adherence to the underlying substrate. Typically, ceramics (e.g., yttria stabilized zirconias, zirconates, pyrochlores and the like) have been employed successfully as thermal barrier coating materials. However, for applications such as automotive applications, the ceramic materials may not be cost effective and may suffer from poor adherence with the underlying metallic substrates (e.g., aluminum-based substrates) because of poor chemical compatibility between the metallic substrate and the ceramic material.

Both aluminum and alumina-based coatings are known in the art, and are used, for example, as diffusion coatings for superalloy substrates or as sacrificial galvanic corrosion resistant coatings for steel substrates.

Typically, cobalt- or nickel-based superalloys, used for high-temperature turbine engines applications, contain aluminum, which is a key component for the precipitation-strengthening of the material. However, exposure to an oxidizing temperature for an extended period may result in aluminum depletion at the surface. Since loss of aluminum can be detrimental to the integrity of the superalloy, techniques for countering such a loss have been investigated. One method for increasing the aluminum content of the superalloy substrate (i.e., in its surface region) is sometimes referred to in the art as "aluminiding" or "aluminizing". In such a process, aluminum is introduced into the substrate by applying an aluminum or alumina based coating (e.g., as a slurry including a binder) on the substrate and subjecting the coating to diffusion heat treatment at temperatures greater than 870° C. The elevated temperature causes the aluminum to melt and diffuse into the underlying substrate to form various intermetallics, e.g., a metal-aluminide compound. For example, in the case of a nickel-base superalloy substrate, the aluminum diffuses and bonds with the nickel to form various nickel-aluminide alloys. The diffusion coatings based on metal aluminides therefore require heat treatment using substantially high temperatures (greater than 870° C.). At such elevated temperatures, the binder components employed for deposition of the coatings are typically volatilized and the final coating after the heat treatment essentially consists of metal aluminides.

Corrosion-resistant coatings have been developed for high strength steels to prevent/minimize stress corrosion cracking. One of the common commercially-available coating employs water-based slurries containing an aluminum-based dispersion in an acidic solution, containing anions such as phosphates and chromates. Upon exposure to heat and curing, these slurries transform to an insoluble electrically conductive metal/ceramic composite. These coating formulations are designed and processed such that the coatings are sacrificial as well as electrical conductive, thereby rendering a galvanic property to the substrate. In some cases, where the substrate for the coating is ferrous metal, the aluminum powder in the coating, by way of electrochemical reactions which ensue in a salt-spray or other corrosive atmosphere, generally sacrifices itself to the end that there is little or no corrosion of the ferrous metal substrate. It has further been established that the sacrificial property of the coating in providing the increased corrosion protection is greatly enhanced by so processing the coating as to render it electrically conductive. Usually, the aluminum filled coatings are made sacrificial and galvanically active by either cold working (burnishing) the coating surface, or by heat treating. The goal is to produce an electrically conductive aluminum coating that is sacrificial, i.e., will corrode and protect the adjacent base metal areas from corrosion. Therefore, the aluminum loading in these compositions is maintained to be sufficiently high such that the coatings are electrically conductive. Further, the coatings are designed such that the aluminum content in the coating reduces during use, thereby rendering the coating sacrificial.

However, the diffusion-based aluminide coatings or the sacrificial, galvanic coatings may not be effective for providing the desired characteristics while functioning as a thermal barrier coating. For example, a sacrificial, galvanic coating may have a high thermal conductivity value because of the higher loading of aluminum in the coating and may therefore not meet the thermal conductivity requirements of a thermal barrier coating. Further, the diffusion-based aluminide coatings or the sacrificial, galvanic coatings may not have the desired coefficient of thermal expansion match with the substrate, which may lead to potential spallation and failure of the coatings.

Thus, there is a need for improved coating compositions that can function as thermal barrier coatings. Further, there is a need for improved methods for forming the thermal barrier coatings.

BRIEF DESCRIPTION

One embodiment of the disclosure is directed to an article including a substrate and a thermal barrier coating disposed on the substrate. The thermal barrier coating includes a plurality of aluminum-based particles dispersed in a binder, wherein the aluminum-based particles are substantially spaced apart from each other via the binder such that the thermal barrier coating is substantially electrically and thermally insulating.

Another embodiment of the disclosure is directed to an article including an automotive component. The automotive component includes a substrate and a thermal barrier coating disposed on the substrate. The thermal barrier coating includes a plurality of aluminum-based particles dispersed in a binder, wherein the plurality of aluminum-based particles includes a core-shell structure, wherein a core of the core-shell structure includes aluminum metal and a shell of the core-shell structure includes a complex of the binder and one or both of aluminum and alumina.

Another embodiment of the disclosure is directed to a method of forming a thermal barrier coating on a substrate. The method includes contacting a slurry including a plurality of aluminum-based particles and an inorganic binder with a surface of the substrate to form a slurry coating. The method further includes heat-treating the slurry coating under conditions sufficient to cure the slurry coating and form the thermal barrier coating, wherein the aluminum-based particles are substantially spaced apart from each other via the binder in the thermal barrier coating such that the thermal barrier coating is substantially electrically and thermally insulating.

BRIEF DESCRIPTION OF THE DRAWINGS

These and other features, aspects, and advantages of the present disclosure will become better understood when the following detailed description is read with reference to the accompanying drawings, in which like characters represent like parts throughout the drawings, wherein.

DETAILED DESCRIPTION

Figure 1:
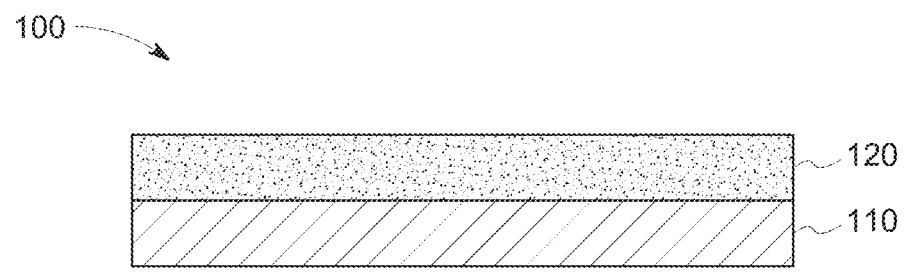
FIG. 1 illustrates a schematic of an article, in accordance with an embodiment of the disclosure.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As used herein, the term "coating" refers to a material disposed on at least a portion of an underlying surface in a continuous or discontinuous manner. Further, the term "coating" does not necessarily mean a uniform thickness of the disposed material, and the disposed material may have a uniform or a variable thickness. The term "coating" may refer to a single layer of the coating material or may refer to a plurality of layers of the coating material. The coating material may be the same or different in the plurality of layers.

As used herein, the term "disposed on" refers to layers or coatings disposed directly in contact with each other or indirectly by having intervening layers there between, unless otherwise specifically indicated. The term "disposing on" refers to a method of laying down material in contact with an underlying or adjacent surface in a continuous or discontinuous manner. The term "adjacent" as used herein means that the two materials or coatings are disposed contiguously and are in direct contact with each other.

As used herein, the term "ceramic" refers to an oxide, carbide, nitride, etc., of a metal. As used herein, the term "substantially free" means the indicated compound, material, component, etc., is minimally present or not present at all, e.g., at a level of about 0.5 weight percent (wt %) or less, more typically at a level of about 0.1 percent (wt %) or less, unless otherwise specified.

In some embodiments, an article is presented. The article includes a substrate and a thermal barrier coating disposed on the substrate. The thermal barrier coating includes a plurality of aluminum-based particles dispersed in an inorganic binder. The aluminum-based particles are substantially spaced apart from each other via the binder such that the thermal barrier coating is substantially electrically and thermally insulating.

FIG. 1 illustrates an article 100 in accordance with an embodiment of the disclosure. The article 100 includes a substrate 110 and a thermal barrier coating 120 disposed on the substrate. As used herein, the term "thermal barrier coating" refers to a coating that includes a material capable of reducing heat flow to the underlying substrate of the article, that is, forms a thermal barrier. The term "thermal barrier coating" and "coating" are used herein interchangeably.

The thermal barrier coating may be further characterized by its thickness. The thickness of the thermal barrier coating may depend upon the substrate or the component it is deposited on. In some embodiments, the thermal barrier coating has a thickness in a range from about 50 microns to about 3000 microns. In some embodiments, the thermal barrier coating has a thickness in a range of from about 25 microns to about 1500 microns. In some embodiments, the thermal barrier coating has a thickness in a range of from about 25 microns to about 1000 microns. The thermal barrier coating may be disposed over a portion or over all of the substrate. The substrate may depend on the nature of the component on which the thermal barrier coating is being applied. In some embodiments, the substrate includes a metal, a metal alloy, or a combination thereof. In certain embodiments, the substrate include iron, an iron alloy, aluminum, an aluminum alloy, or combinations thereof.

As used herein, the term "aluminum-based particles" refers to particles including aluminum metal, alumina, an aluminum alloy, or combinations thereof. Alumina typically has the formula $Al_2O_3$, and in the context of the present disclosure includes unhydrated and hydrated forms. As used herein, the term "particles" refers to a particle, powder, flake, plate, rod, fiber, wire, mesh, or combinations thereof.

The particles may be formed by, for example, grinding, shredding, fragmenting, pulverizing, atomization (for example, gas atomization), or otherwise subdividing a larger form of the material into a relatively small form. The aluminum-based particles can be used in a variety of standard sizes. The size of the aluminum-based particles may depend on several factors, such as the type of substrate; the technique by which the coating is to be applied to the substrate; the identity of the other components present in the coating; and the relative amounts of those components. Usually, the aluminum-based particles have an average particle size in the range from about 0.5 microns to about 100 microns. In some embodiments, the aluminum-based particles have an average particle size in the range of from about 0.5 microns to about 80 microns, from about 1 micron to about 50 microns, from about 1 micron to about 30 microns, or any combination, sub-combination, range, or sub-range thereof.

In some embodiments, the plurality of aluminum-based particles is substantially free of an aluminide. The term "aluminide" or "aluminide-containing" as used herein is meant to include a variety of aluminum-containing materials that are typically used in coating metal alloys (especially superalloys), or which are formed during or after the coating process (e.g., by diffusion process). Non-limiting examples include platinum aluminide, nickel aluminide, platinum-nickel aluminide, refractory-doped aluminides, or alloys which contain one or more of those compounds. In certain embodiments, the plurality of aluminum-particles includes less than 0.5 wt. % of an aluminide.

In certain embodiments, a surface region of the substrate is substantially free of an aluminide. In certain embodiments, a surface region of the substrate is substantially free of an aluminide formed by diffusion of aluminum from the aluminum-based particles into the substrate. As used herein, the "surface region" usually extends to a depth of up to about 200 microns into the surface, and more frequently, to a depth of up to about 75 microns into the surface. This is in contrast to aluminum-based diffusion coatings as described earlier. In typically diffusion coatings, the coating is subjected to heat treatment temperatures greater than 870° C., thereby diffusing the aluminum into the surface region of the substrate and forming a metal aluminide. The thermal barrier coatings of the present disclosure are substantially free of the aluminide as the coatings are cured at temperatures lower than the diffusion temperature for aluminum into the substrate.

As used herein, the term "inorganic binder" refers to a composition, that, when cured, forms an amorphous, glassy matrix in which the aluminum-based particles are embedded in, are encapsulated in, are enclosed by, or otherwise adhered to. In some embodiments, the inorganic binder includes a chromate, a phosphate, a molybdate, a vanadate, a tungstate, or combinations thereof.

In embodiments, wherein the inorganic binder includes a chromate, the chromate is present as a hexavalent chromium in solution. While describing this form of chromium as chromate, it is to be understood that under acid conditions, the ion may be typically present as a dichromate. The term "chromate" is used herein for convenience. The chromate in solution may be supplied by chromic acid, by a metal chromate, or a dichromate. Chromate-containing inorganic binder compositions can include one or more metal chromates, including aluminum chromates, magnesium chromates, zinc chromates, iron chromates, lithium chromates, calcium chromates, or combinations thereof.

In embodiments, wherein the inorganic binder includes a phosphate, the phosphate is present as a phosphate ion in solution. The phosphate ion can be supplied from a variety of sources including phosphoric acid solutions and other materials such as phosphate salts of metals including monobasic, dibasic and tribasic salts. Phosphate-containing binder compositions can include one or more metal phosphates, including aluminum phosphates, magnesium phosphates, chromium phosphates, zinc phosphates, iron phosphates, lithium phosphates, calcium phosphates, or combinations thereof. These salts can be used in conjunction with phosphoric acid to produce acid phosphate solutions. Other anhydrides or compounds that produce phosphate in solution can be used such as phosphorous pentoxide, metaphosphorous acid, phosphorous acid and hypophosphorous acid. Phosphorous acid and hypophosphorous acid produce phosphate ion in these binders by reaction with oxidizing agents such as hexavalent chromium in solution.

In embodiments, wherein the inorganic binder includes a molybdate, the molybdate is present as a molybdate ion in solution. The molybdate ion can be supplied from molybdenum trioxide or metallic molybdates.

In certain embodiments, the inorganic binder includes a chromate and one or more of a phosphate, a molybdate, a vanadate, and a tungstate. In some such embodiments, the ratio of chromate to another binder (e.g., phosphate) may vary in a range of from about 1:4 to about 4:1 by weight. In certain embodiments, the inorganic binder includes a chromate-phosphate binder.

Because of the toxicity and potential carcinogenic properties of hexavalent chromium, special handling procedures may need to be typically employed, in order to satisfy health and safety regulations. The special handling procedures can often result in increased costs and decreased productivity. Therefore, in certain other embodiments, the inorganic binder is substantially free of hexavalent chromium. In some such embodiments, the inorganic binder includes colloidal silica. The term "colloidal silica" as used herein refers to particles of silica. Dispersions of colloidal silica are available from various chemical manufacturers, in either acidic or basic form. Moreover, various shapes of silica particles may be used, e.g., spherical, hollow, porous, rod, plate, flake, or fibrous, as well as amorphous silica powder.

As will be appreciated by one of ordinary skill in the art, the aluminum-based particles and the binder compositions (such as, for example, chromate, phosphate, or colloidal silica) may further interact or react with each other during one or more of disposing and post-processing steps. Therefore, the terms "aluminum-based particles" and "inorganic binder" as used herein connotate both the non-reacted as well as reacted forms of the particles and the binder.

The composition of the thermal barrier coating in terms of the amount of the aluminum and the inorganic binder may depend upon one or more factors, including the composition of the adjacent bond coat layer (if present), the coefficient of thermal expansion (CTE) characteristics desired for the thermal barrier coating, and the thermal barrier properties desired for the thermal barrier coating. In certain embodiments, the amount of aluminum-based particles (sometimes referred to in the art as "aluminum loading") may be maintained in the thermal barrier coating such that the thermal barrier coating is substantially thermally and electrically insulating. This is in contrast to sacrificial corrosion resistant coatings employed for metallic substrates, as discussed herein earlier. Although, these aforementioned sacrificial corrosion resistant coatings may also include aluminum-based particles in an inorganic binder, the aluminum loading of these coatings is maintained such that these corrosion resistant coatings are substantially electrically conductive.

As used herein, the term "substantially electrically insulating" means that the thermal barrier coating has an electrical resistivity greater than 1 ohm.metre (Ω.m). In some embodiments, the electrical resistivity of the thermal barrier coating is greater than $10^2$ Ω.m. As used herein, the term "substantially thermally insulating" means that the thermal barrier coating has a thermal conductivity lower than 2.2 W/m-K. In some embodiments, the thermal conductivity of the thermal barrier coating is lower than 1.5 W/m-K.

In some embodiments, the plurality of aluminum-based particles is present in the thermal barrier coating in an amount in a range from about 20 volume percent to about 70 volume percent, in a range from about 30 volume percent to about 60 volume percent, in a range from about 50 volume percent to about 60 volume percent, or any combination, sub-combination, range, or sub-range thereof; and the binder is present in the thermal barrier coating in an amount in a range from about 30 volume percent to about 80 volume percent, in a range from about 40 volume percent to about 70 volume percent, in a range from about 40 volume percent to about 50 volume percent or any combination, sub-combination, range, or sub-range thereof. In certain embodiments, the plurality of aluminum-based particles is present in the thermal barrier coating in an amount in a range from about 40 volume percent to about 50 volume percent and the binder is present in the thermal barrier coating in an amount in a range from about 50 volume percent to about 60 volume percent. As mentioned previously, the loading of aluminum in the thermal barrier coating is controlled such that the thermal barrier coating is substantially electrically insulating.

Figure 2:
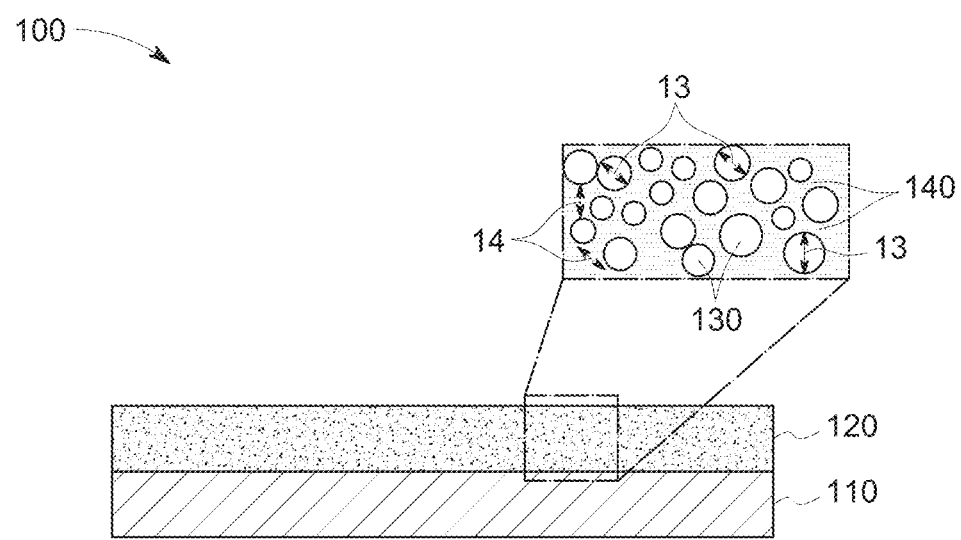
FIG. 2 illustrates a schematic of an article, in accordance with an embodiment of the disclosure.

The thermal barrier coating is further characterized by the average domain size of the aluminum-based particles and the inorganic binder. This is further illustrated in FIG. 2, wherein an expanded portion of a thermal barrier coating 120 is illustrated. The thermal barrier coating includes the plurality of aluminum-based particles 130 dispersed in the inorganic binder 140. The plurality of aluminum-based particles 130 is further characterized by a domain size 13 and the inorganic binder is characterized by a domain size 14.

An average domain size of the aluminum-based particles in the thermal barrier coating may be least 0.5 microns, at least 1 micron, at least 2 microns, in a range from about 0.5 microns to about 30 microns, in a range from about 1 micron to about 10 microns, or any combination, sub-combination, range, or sub-range thereof. Similarly, an average domain size of the binder in the thermal barrier coating may be at least 0.5 microns, at least 1 micron, at least 2 microns, in a range from about 0.5 microns to about 5 microns, in a range from about 1 micron to about 5 microns, or any combination, sub-combination, range, or sub-range thereof.

Figure 3:
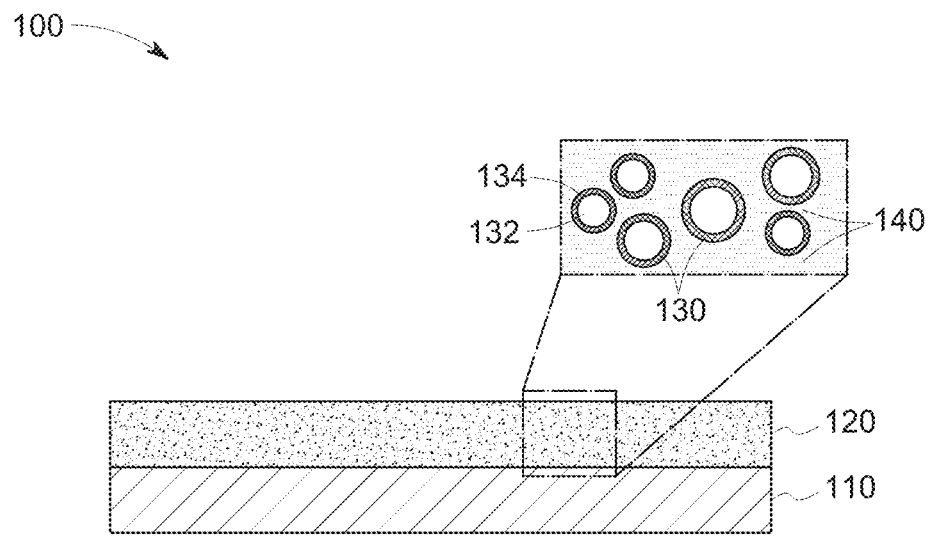
FIG. 3 illustrates a schematic of an article, in accordance with an embodiment of the disclosure.

In certain embodiments, the aluminum-based particles dispersed in the inorganic matrix may be further characterized by a core-shell structure. FIG. 3 illustrates a schematic of a thermal barrier coating including 120 including a plurality of aluminum-based particles 130 having a core-shell structure, for example. In the embodiment illustrated in FIG. 3, the particle 130 includes a core 132 and a shell 134. It should be noted, that for the purposes of illustration, the aluminum-based particles in FIGS. 1 and 3 are depicted as having a spherical shape, however, other shapes of the aluminum-based particles are also encompassed within the scope of the disclosure. For example, the aluminum-based particles may have a conical, tubular, square, rectangular, or any other irregular shape.

Figure 4:
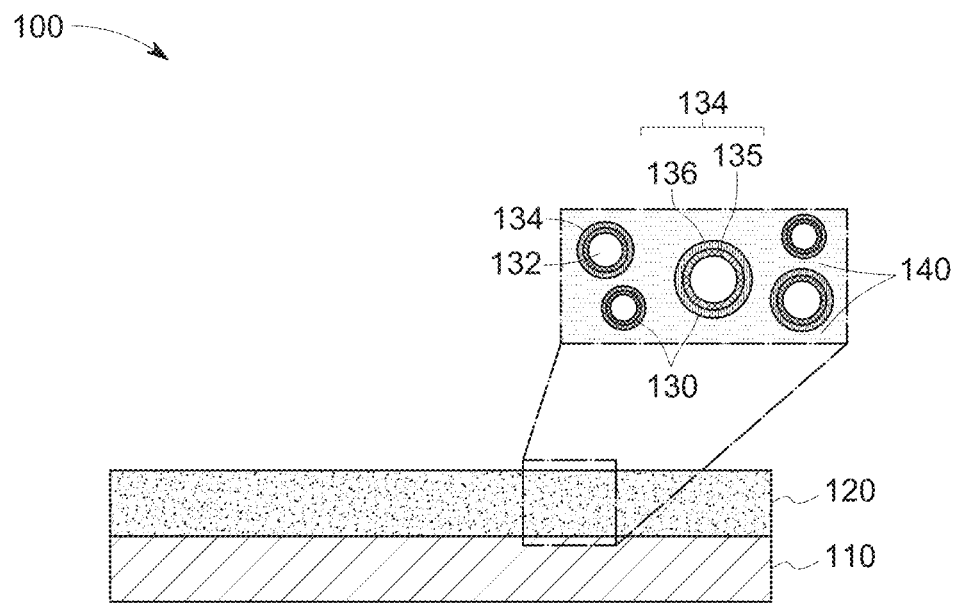
FIG. 4 illustrates a schematic of an article, in accordance with an embodiment of the disclosure.

In certain embodiments, the core 132 of the core-shell structure includes aluminum metal and the shell 134 of the core-shell structure includes a complex of the binder and one or both of aluminum and alumina. The term complex as used herein includes both covalently and non-covalently bound compounds of the binder with the aluminum/alumina. In certain embodiments, wherein the binder includes a chromate-phosphate binder, the core 132 of the core-shell structure includes aluminum metal and the shell 134 of the core-shell structure includes at least one of an aluminum chromate phosphate and an alumina chromate phosphate. In some such embodiments, as illustrated in FIG. 4, the shell 134 of the core-shell structure may further include a first layer 135 disposed proximate to the core 132 and a second layer 136 disposed on the first layer 135. In some such instances, the first layer 135 includes aluminum chromate phosphate and the second layer 136 includes alumina chromate phosphate.

The core 132 of the core-shell structure may have an average size of at least 0.5 microns, at least 1 micron, at least 2 microns, in a range from about 0.5 microns to about 30 microns, in a range from about 1 micron to about 10 microns, or any combination, sub-combination, range, or sub-range thereof. The term "size" as used in this context refers to the largest dimension of the core 132 in the core-shell structure, and as will apparent to one of ordinary skill in the art will depend on the shape of the core-shell structure. Similarly, a thickness of the shell 134 of the core-shell structure may be at least 0.5 microns, at least 1 micron, at least 2 microns, in a range from about 0.5 microns to about 5 microns, in a range from about 1 micron to about 5 microns, or any combination, sub-combination, range, or sub-range thereof. Further, although the thickness of the shell 134 is illustrated as substantially uniform in FIG. 4, the thickness may be non-uniform and vary around the periphery of the core 132.

Figure 5:
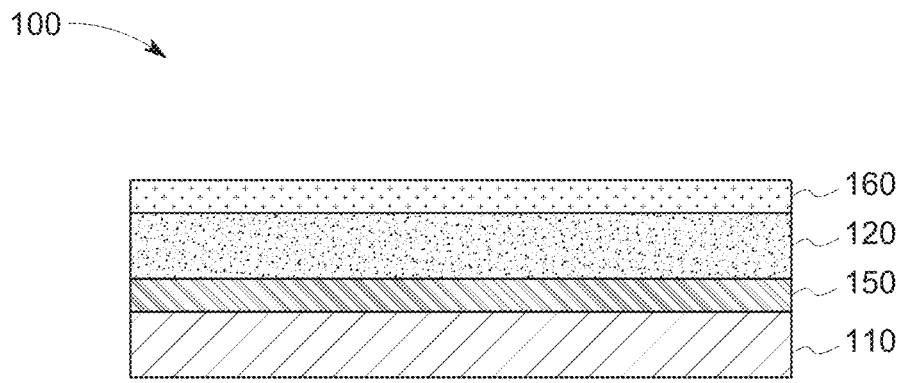
FIG. 5 illustrates a schematic of an article, in accordance with an embodiment of the disclosure.

In some embodiments, the article may further include a bond coating disposed between the substrate and the thermal barrier coating. FIG. 5 illustrates an embodiment wherein the article 100 includes a bond coating 150. In the embodiment illustrated in FIG. 5, the article 100 includes a bond coating 150, a thermal barrier coating 120, and a protective coating (also referred to as top-coat) 160. The bond coating 150 may be formed from a metallic oxidation-resistant material that protects the underlying substrate and enables the thermal barrier coating to more tenaciously adhere to substrate. The bond coating 150 may have a thickness in the range of from about 25 microns to about 500 microns. In some embodiments, the protective coating 160 may include a CMAS-reactive protective coating, an environmental barrier coating, or an erosion resistant layer.

The coatings of the present disclosure may be useful in a wide variety of components that are operated at, or exposed to, high temperatures. In certain embodiments, the article includes an automotive component, a locomotive component, a marine component, or a medical component. In some such embodiments, the article includes a diesel engine component. In certain embodiment, automotive components including the thermal barrier coatings in accordance with embodiments of the disclosure are also presented. Non-limiting examples of automotive components include a piston, a valve, a cylinder head, an exhaust pipe, a turbo housing, a catalyst container, an exhaust manifold, or combinations thereof. In certain embodiments, the thermal barrier coatings of the present disclosure are particularly useful for providing thermal protection to pistons in an automotive engine. In some such embodiments, the substrate includes aluminum, iron, or a combination thereof.

In some embodiments, a method of forming a thermal barrier coating on a substrate is also presented. The thermal barrier coating may be disposed or otherwise formed on a bond coating (if present) or on the substrate directly by any of a variety of conventional techniques. The particular technique used for disposing, depositing or otherwise forming the thermal barrier coating may depend on one or more of the composition of the thermal barrier coating, the thickness, and the physical structure desired for the thermal barrier coating. In certain embodiments, the thermal barrier coating is disposed on a bond coating (if present) or on the substrate directly, using a slurry.

Figure 6:
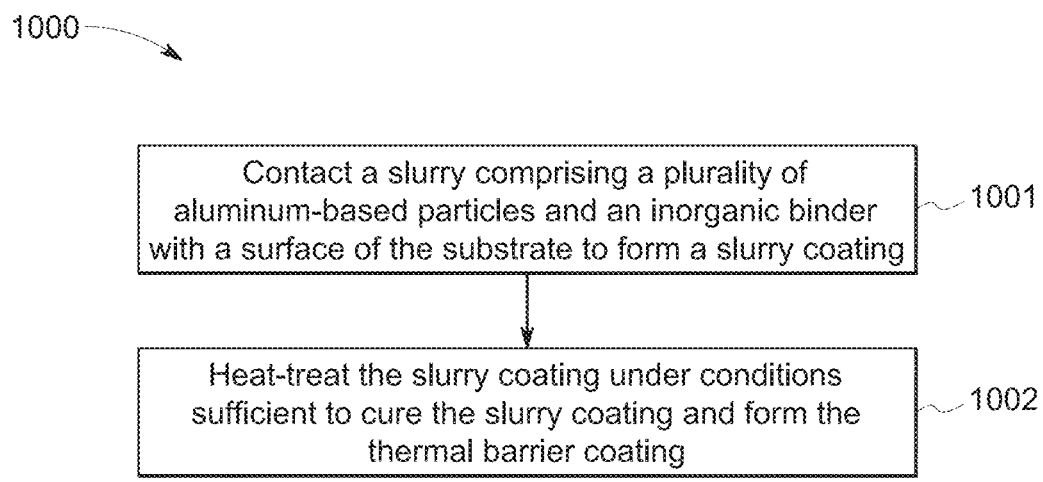
FIG. 6 illustrates a flow chart of a method of forming a thermal barrier coating, in accordance with an embodiment of the disclosure.
Figure 7:
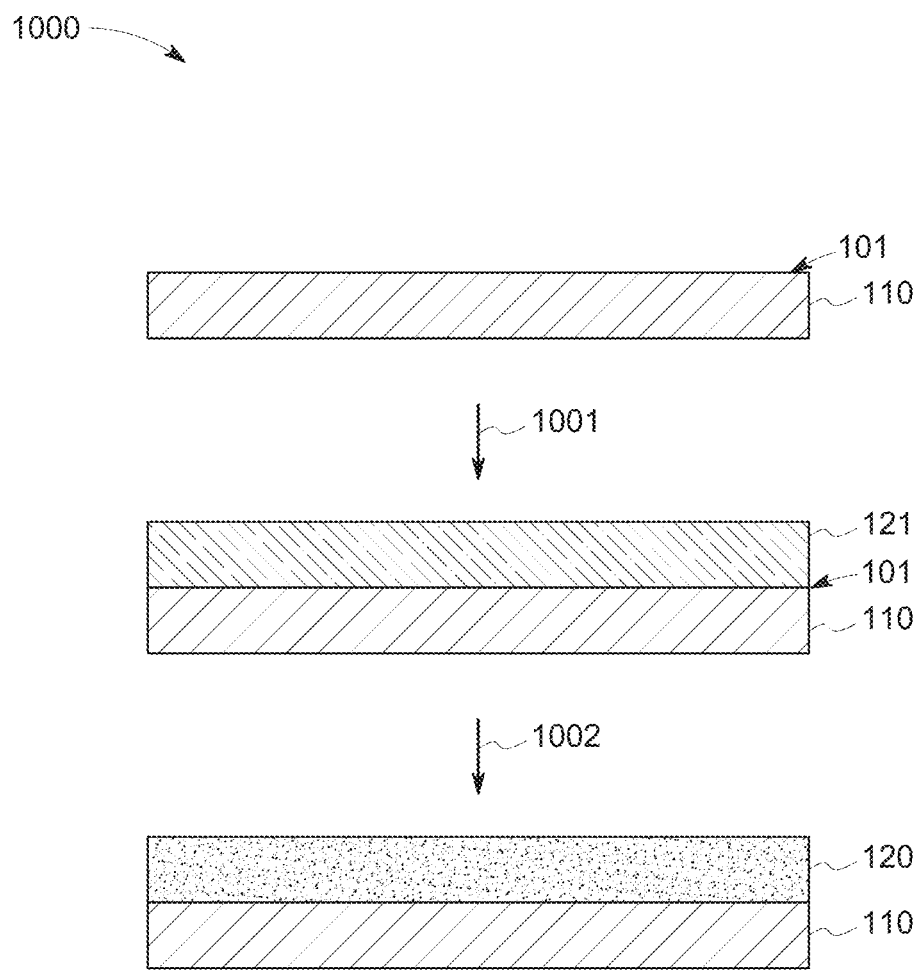
FIG. 7 illustrates a method of forming a thermal barrier coating, in accordance with an embodiment of the disclosure.

Referring now to FIGS. 6 and 7, a method 1000 of forming a thermal barrier coating 120 on a substrate 110 is illustrated. The method includes, at step 1001, contacting a slurry including a plurality of aluminum-based particles and an inorganic binder with a surface 101 of the substrate 110 to form a slurry coating 121. Suitable examples of the plurality of aluminum-based particles and the inorganic binder have been described herein earlier.

Use of a slurry for disposing a thermal barrier coating may present many advantages. For example, slurries can be easily and economically prepared, and their aluminum content can be readily adjusted to meet the requirements for a particular substrate. Moreover, the slurries can be applied to the substrate by a number of different techniques, and their wetting ability helps to ensure relatively uniform thickness. The slurry includes a plurality of aluminum-based particles and an organic binder, typically suspended or otherwise contained in a liquid carrier component. As used herein, the term "liquid carrier component" refers to any carrier component that is liquid at ambient temperatures and in which the aluminum-based particles and an organic binder is typically carried in, dispersed in, dissolved in, etc. Liquid carrier components include aqueous systems (e.g., including water), organic systems (e.g., including alcohols such as ethanol, propanol, isopropanol, etc., other liquid organic materials or solvents such as ethylene glycol, acetone, toluene, xylene, alkanes, etc.) or any combination thereof. These liquid carrier components can include other optional materials such as surfactants, buffers, etc. Aqueous carrier component can consist essentially of water, i.e., is substantially free of other optional materials, but more typically includes other optional materials such as compatible organic solvents, surfactants, etc. Suitable surfactants for use in aqueous carrier components can include nonionic surfactants, anionic surfactants, cationic surfactants, amphoteric surfactants, zwitterionic surfactants, or any combination thereof.

The slurry can be loaded with a varying proportion of aluminum-based particles and the inorganic binder, depending upon the desired rheological properties of the slurry, coating thickness, or desired loading of the aluminum-based particles in the thermal barrier coating. In some embodiments, the amount of liquid carrier solvent in the slurry is in an amount in a range from about 10 volume percent to about 50 volume percent, in a range from about 20 volume percent to about 40 volume percent, in a range from about 25 volume percent to about 30 volume percent, or any combination, sub-combination, range, or sub-range thereof. In some embodiments, the volume ratio of aluminum-based particles to the inorganic binder in the slurry is in an amount in a range from about 0.5 to about 1.2, in a range from about 0.5 to about 1, in a range from about 0.67 to about 1, or any combination, sub-combination, range, or sub-range thereof. The slurry may further include other optional components such as colorants or pigments, viscosity modifying or controlling agents, etc.

Referring again to FIGS. 6 and 7, the method 1000 according to embodiments of the present disclosure includes a step 1001 of contacting a slurry with at least a portion of a surface 101 of the substrate 110. Some embodiments include a step 1001 of contacting the slurry with substantially all of a surface 101 of the substrate 110. The slurry can be contacted with the substrate by a variety of techniques known in the art. In some embodiments, the slurries can be slip-cast, brush-painted, dipped, sprayed, poured, rolled, or spun-coated onto the substrate surface, for example. In certain embodiments, the slurry is spray-coated on a surface of the substrate. The viscosity of the coating can be readily adjusted for spraying, by varying the amount of the liquid carrier used.

The slurry can be applied as a single layer or multiple layers. Therefore, in some embodiments, the step 1001 may be effected multiple times until a desired thickness of the slurry coating 121 is achieved. In some embodiments, the slurry coating 121 has a thickness in a range from about 50 microns to about 3000 microns. In some embodiments, the slurry coating has a thickness in a range of from about 25 microns to about 1500 microns. In some embodiments, the slurry coating has a thickness in a range of from about 25 microns to about 1000 microns.

Referring again to FIGS. 6 and 7, the method further includes, at step 1002, heat-treating the slurry coating 121 under conditions sufficient to cure the slurry coating 121 and form the thermal barrier coating 120. As noted earlier, the formed thermal barrier coating 120 coating includes aluminum-based particles that are substantially spaced apart from each other via the binder in the thermal barrier coating such that the thermal barrier coating is substantially electrically and thermally insulating.

In some embodiments, after an initial application of the slurry to the substrate surface, the slurry coating may be dried to substantially remove any volatiles. After the full thickness of the slurry coating has been applied, an additional, optional heat treatment (drying step) may be carried out, to further remove volatile materials like additional solvents (if used) and water. The heat treatment conditions for drying will depend in part on the identity of the volatile components in the slurry. In some embodiments, this drying step may include, for example, air drying for a period (e.g., greater than 15 minutes) and at a temperature (e.g., from about 70° C. to a about 100° C.). If a series of layers is used, a drying step can be performed after each layer is deposited, to accelerate removal of the volatile components.

After drying, the slurry coating 121 may be cured using suitable heat treatment conditions to form the thermal barrier coating, at step 1002, as shown in FIGS. 6 and 7. As used herein, the term "curing" refers to any treatment condition or combination of treatment conditions that causes the slurry coating to form the thermal barrier coating. A discussed previously, in certain embodiments, the slurry coating is heat-treated at a temperature lower than a temperature sufficient for diffusing aluminum from the aluminum-based particles into a surface region of the substrate. In some embodiments, the slurry coating is heat-treated at a temperature lower than 300° C., at a temperature lower than 250° C., at a temperature in a range from about 150° C. to about 250° C., at a temperature in a range from about 170° C. to about 200° C., or any combination, sub-combination, range, or sub-range thereof.

If more than one contacting step 1001 is employed, then drying and/or curing may be conducted after each contacting step 1001. In some embodiments. the method may further include subjecting the cured slurry coating to a burnishing step to form the thermal barrier coating.

The thermal barrier coating may be formed off-site or on-site, to in-use components, to new components, or a combination thereof. As used herein, in-use component refers to any component which has been previously manufactured for and/or placed in operation. If necessary or desired, (as in for example, a repair method), the article (e.g., a diesel engine component) may be mechanically worked prior to application of the slurry, for example, to remove damage or to smooth the surface of the engine component.

Without being bound by any theory, it is believed that the thermal barrier coatings of the present disclosure may provide the required thermal barrier properties in a cost-effective manner as an alternative to ceramic thermal barrier coatings. In particular, inventors of the present disclosure have found that the thermal barrier coatings including aluminum-based particles in an inorganic binder provide the desired thermal barrier coating properties for automotive components, such as, pistons in a cost-effective manner.

EXAMPLES

Figure 8:
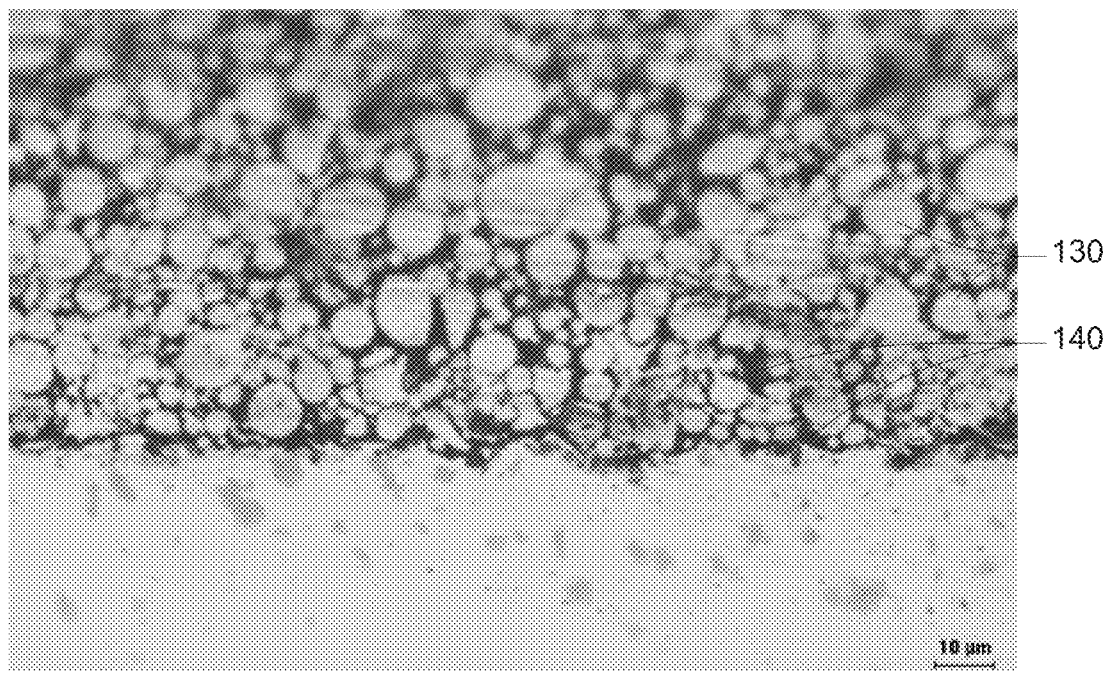
FIG. 8 illustrates an optical micrograph of the microstructure described in the Examples.

An internal combustion engine was coated with a slurry composition including aluminum particles and a chromate-phosphate binder. Portions of the pistons were subjected to sequential surface preparation, spray coating and burnishing steps to form a thermal barrier coating having a thickness of about 150±15 microns. Mechanical properties (e.g., hardness), thermal conductivity, coefficient of thermal expansion match, durability (e.g., spallation) and microstructure of the coatings were evaluated. The thermal barrier coatings exhibited the desired thermal conductivity and coefficient of thermal expansion match with the substrate. Further, the thermal barrier coatings after standard engine test procedure exhibited no or minimal spallation, and superior hardness values. Optical micrographs of the microstructure (as shown in FIG. 8) showed distinct plurality of aluminum particulate domains (aluminum-based particles 130) dispersed in the binder 140 matrix.

The foregoing examples are merely illustrative, serving to exemplify only some of the features of the invention. The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. An article, comprising:
   a substrate; and
   a thermal barrier coating disposed on the substrate, wherein the thermal barrier coating comprises a cured slurry coating, wherein the cured slurry coating comprises a plurality of aluminum-based particles dispersed in an inorganic binder, wherein the aluminum-based particles are substantially spaced apart from each other via the inorganic binder such that the cured slurry coating is substantially electrically and thermally insulating and the aluminum-based particles comprise aluminum metal, an aluminum alloy or combinations thereof.

2. The article of claim 1, wherein an average domain size of the plurality of aluminum-based particles in the cured slurry coating is in a range from about 0.5 microns to about 30 microns.

3. The article of claim 1, wherein an average domain size of the inorganic binder in the cured slurry coating is in a range from about 0.5 microns to about 5 microns.

4. The article of claim 1, wherein the plurality of aluminum-based particles is present in the cured slurry coating in an amount in a range from about 20 volume percent to about 70 volume percent, and the inorganic binder is present in the cured slurry coating in an amount in a range from about 30 volume percent to about 80 volume percent.

5. The article of claim 1, wherein the inorganic binder comprises a chromate, a phosphate, a molybdate, a vanadate, a tungstate, or combinations thereof.

6. The article of claim 1, wherein the plurality of aluminum-based particles comprises a core-shell structure.

7. The article of claim 6, wherein a core of the core-shell structure comprises aluminum metal and a shell of the core-shell structure comprises a complex of the inorganic binder and aluminum.

8. The article of claim 1, wherein the article comprises an internal combustion engine component.

9. An article, comprising:
   an automotive component comprising:
   a substrate; and
   a thermal barrier coating disposed on the substrate, wherein the thermal barrier coating comprises a cured slurry coating and a burnished coating surface, wherein the cured slurry coating comprises a plurality of aluminum-based particles dispersed in an inorganic binder, wherein the plurality of aluminum-based particles comprises a core-shell structure, wherein a core of the core-shell structure comprises aluminum metal and a shell of the core-shell structure comprises a complex of the inorganic binder and aluminum.

10. The article of claim 9, wherein the substrate comprises aluminum, aluminum alloy, iron, iron alloy, or a combination thereof.

11. The article of claim 9, wherein the automotive component comprises a piston, a valve, a cylinder head, an exhaust pipe, a turbo housing, a catalyst container, an exhaust manifold, or combinations thereof.

12. The article of claim 1, wherein the cured slurry coating has an electrical resistivity greater than 1 ohm.m and a thermal conductivity lower than 2.2 W/m-K and wherein the slurry coating is cured by heat treatment at a temperature lower than 300° C.

13. The article of claim 1, wherein the cured slurry coating has an electrical resistivity greater than 1 ohm.m and a thermal conductivity lower than 2.2 W/m-K and the thermal barrier coating further comprises a burnished coating surface.

14. The article of claim 1, wherein the article further comprises a bond coating disposed between the substrate and the thermal barrier coating.

15. The article of claim 1, wherein the article further comprises a protective coating.

16. The article of claim 9, wherein the cured slurry coating has an electrical resistivity greater than 1 ohm.m and a thermal conductivity lower than 2.2 W/m-K and wherein the slurry coating is cured by heat treatment at a temperature lower than 300° C.

17. The article of claim 9, wherein the article further comprises a bond coating disposed between the substrate and the thermal barrier coating.

18. The article of claim 9, wherein the article further comprises a protective coating.

19. An article, comprising:
a substrate; and
a thermal barrier coating disposed on the substrate, wherein the thermal barrier coating comprises a cured slurry coating and a burnished coating surface, wherein the cured slurry coating comprises a plurality of aluminum-based particles dispersed in an inorganic binder, wherein the aluminum-based particles are substantially spaced apart from each other via the inorganic binder such that the cured slurry coating is substantially electrically and thermally insulating and the aluminum-based particles comprise aluminum metal, an aluminum alloy or combinations thereof.

20. The article of claim 19, wherein the article comprises an internal combustion engine component.

21. The article of claim 19, wherein the inorganic binder comprises a chromate, a phosphate, a molybdate, a vanadate, a tungstate, or combinations thereof and wherein the slurry coating is cured by heat treatment at a temperature lower than 300° C.

* * * * *